United States Patent [19]
Cheng et al.

[11] Patent Number: 5,402,052
[45] Date of Patent: Mar. 28, 1995

[54] INDUCTIVE CURRENT SWITCHING SYSTEM WITH RESONANCE

[75] Inventors: David C. Cheng, Palo Alto, Calif.; Tarek Makansi, Tuson, Ariz.; Muthuthamby Sri-Jayantha, Ossining, N.Y.

[73] Assignee: International Business Machines Corporation, Armonk, N.Y.

[21] Appl. No.: 164,736

[22] Filed: Dec. 8, 1993

Related U.S. Application Data

[63] Continuation of Ser. No. 970,980, Nov. 3, 1992, abandoned, which is a continuation of Ser. No. 688,186, Apr. 19, 1991, abandoned, which is a continuation-in-part of Ser. No. 357,511, May 25, 1989, Pat. No. 5,121,369.

[51] Int. Cl.$^6$ ............................................. H02P 8/00
[52] U.S. Cl. ........................................ 318/696; 316/685
[58] Field of Search ........................... 363/63, 132, 98; 318/685, 58, 696

[56] References Cited

U.S. PATENT DOCUMENTS

| | | | |
|---|---|---|---|
| 3,247,447 | 4/1966 | Flairty | 363/58 |
| 4,434,922 | 2/1984 | Brasseur | 318/685 |
| 4,584,506 | 4/1986 | Kaszmann | 318/254 |
| 4,710,691 | 12/1987 | Bergstrom et al. | 318/696 |
| 4,763,239 | 8/1988 | Ball | 363/98 |
| 4,816,726 | 3/1989 | Novis et al. | 318/293 |
| 4,891,745 | 1/1990 | Lafore et al. | 363/98 |
| 4,926,354 | 5/1990 | Pattantyus | 363/98 |
| 5,079,649 | 1/1992 | Pahr | 360/66 |

FOREIGN PATENT DOCUMENTS 0312143  4/1989  Netherlands.

OTHER PUBLICATIONS

C. B. Nebgen, "H-Drive Circuit for Stepper Motor", IBM Technical Disclosure Bulletin, vol. 24, No. 1A, Jun. 1981, pp. 377–178.

J. A. Bailey, et al., "Predriver For H Configured Write Driver for Magnetic Recording", vol. 23, No. 11, Apr. 1981, pp. 5167–5168, IBM Technical Disclosure Bulletin.

*Primary Examiner*—Jonathan Wysocki
*Assistant Examiner*—Brian Sircus
*Attorney, Agent, or Firm*—Douglas R. Millett

[57] ABSTRACT

An inductor is connected in parallel with a capacitor. A first and a second current source provide current to the inductor in opposite directions. Rapid current switching in the inductor is achieved by allowing the inductor and capacitor to resonate in a time period between the application of current from the first and second current source.

6 Claims, 9 Drawing Sheets

FIG. 10A
i(t)=50ma/DIV  t=50ns/DIV

FIG. 10B
V(t)=10V/DIV  t=50ns/DIV

FIG. 11A
i(t)=50ma/DIV  t=50ns/DIV

FIG. 11B
V(t)=10V/DIV  t=50ns/DIV

FIG. 12A
i(t)=50ma/DIV  t=50ns/DIV

FIG. 12B
V(t)=10V/DIV  t=50ns/DIV

INDUCTIVE CURRENT SWITCHING SYSTEM WITH RESONANCE

This is a continuation of Ser. No. 07/970,980, filed Nov. 3, 1992, now abandoned, which is a continuation of Ser. No. 07/688,186, filed Apr. 19, 1991 now abandoned which is a continuation in part of Ser. No. 07/357,511, filed May 25, 1989, now U.S. Pat. No. 5,121,369.

BACKGROUND OF THE INVENTION

Field of the Invention

This invention relates to electrical current switching and more particularly to rapid current switching for inductors.

Description of the Prior Art

Rapid reversal of electrical current in inductive loads is an engineering challenge that limits the performance of many electrical and electromechanical systems. The systems include brushless DC motors, stepper motors, voice coil motors, and magnetic recording heads.

Brushless DC motors and stepper motors operate on the principle of repetitive force generation between electromagnets and permanent magnets. Typically, one set of magnets moves with the mechanical load while the other set remains stationary. The electromagnets start at one polarity such that attraction to the downstream permanent magnets occurs. As the motion brings the magnet sets together, the current in the electromagnets is abruptly reversed by reversing the winding current. Then, the electromagnet will attract the next downstream permanent magnet, producing motion in the same direction. The current reversal continues repetitively as long as motion is desired. From the electrical point of view, the motor's windings represent an inductive load to the circuit that drives it.

U.S. Pat. No. 4,584,506 issued Apr. 22, 1986 to Kaszman; U.S. Pat. No. 4,710,691 issued Dec. 1, 1987 to Bergstrom, et al.; and IBM Technical Disclosure Bulletin, Vol. 24, No. 1A, June 1981 by Nebgen illustrate inductor driver circuits for electrical motors of the prior art.

The windings of a magnetic recording head during the writing of data also represent an inductive load to the driver circuit. Traditionally, the inductive characteristic limits the rise time of the current when confined to a typical power supply voltage. The magnetic field produced by the head is proportional to the current flow in the head's windings and the head's inductance limits the data rate of the overall recording system.

The problem of inductance in recording heads is apparent in every segment of the disk drive industry. Small disk drives typically use ferrite heads, which have high inductance (several microhenries), and hence limit the data rates to about 1.25 megabytes per second. One solution is to use thin film heads which have lower inductance, however, these are much more expensive.

It is well known to the art that faster switching can be achieved by increasing the supply voltage. High voltage supplies are costly, unsafe, and unavailable in most computer enclosures that house disk drives. Also, more power is consumed in the large voltage drop from the supply to ground. For small, battery powered portable disk drives, this extra power is not available.

The limit on the data rate imposed by the inductance of magnetic recording heads is evident by calculating the time constant (inductance/resistance). For example, a typical ferrite head has an inductance of 2.5 uH, and needs a current flow of 50 ma to reach the writing field strength. If the supply voltage after the device voltage drop is 3 volts, then the resistance to ground is 60 ohms, making the rise time (L/R) equal to 40 ns. This rise time is sufficient for data rates of only 1.25 megabytes per second at a frequency of 3 Mhz.

IBM Technical Disclosure Bulletin, Vol. 23, No. 11, April 1981, by Bailey, et al. shows a typical inductor driver circuit for a recording head of the prior art.

There is a need for an inductor driver circuit which can achieve higher rates of current switching in order to improve the performance of electrical devices such as motors and recording heads.

SUMMARY OF THE INVENTION

In accordance with the present invention, a capacitor having a capacitance C is connected in parallel with an inductor having an inductance L. A first and a second switch are connected to the inductor. A first current source is connected to the first switch to provide current to the inductor in a first direction. A second current source is connected to the second switch to provide current in a second direction. A switch control is connected to both the first and second switches and controls the timing of the opening and closing of the switches. The switch control alternately opens and closes the first and second switches in turn and waits a period of $\pi(LC)^{1/2}$ seconds between the time one switch is opened and the time the other switch is closed. The result is that the present invention uses the resonance between the inductor and the capacitor to rapidly switch the current direction in the inductor.

For a fuller understanding of the nature and advantages of the present invention reference should be made to the following detailed description taken in conjunction with the accompanying drawings.

DESCRIPTION OF THE PREFERRED EMBODIMENTS

Figure 1:
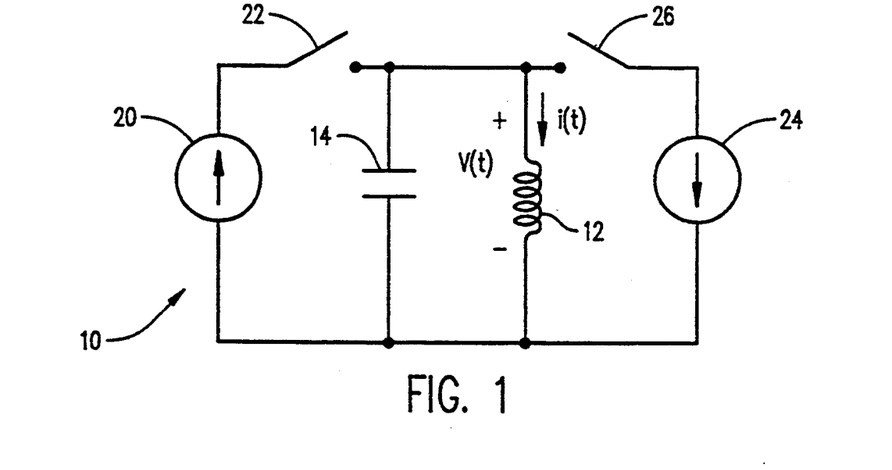
FIG. 1 is a circuit diagram showing the operational theory of the present invention.

FIG. 1 shows a generalized circuit of the present invention and is designated by the general reference number 10. Circuit 10 comprises an inductor 12, having inductance L connected in parallel with a capacitor 14, having capacitance C. A current source 20 is connected to inductor 12 via a switch 22. Source 20 provides current in a first direction to inductor 12. A current source 24 is connected to inductor 12 via a switch 26. Source 24 provides current in a second direction to inductor 12.

Figure 2:
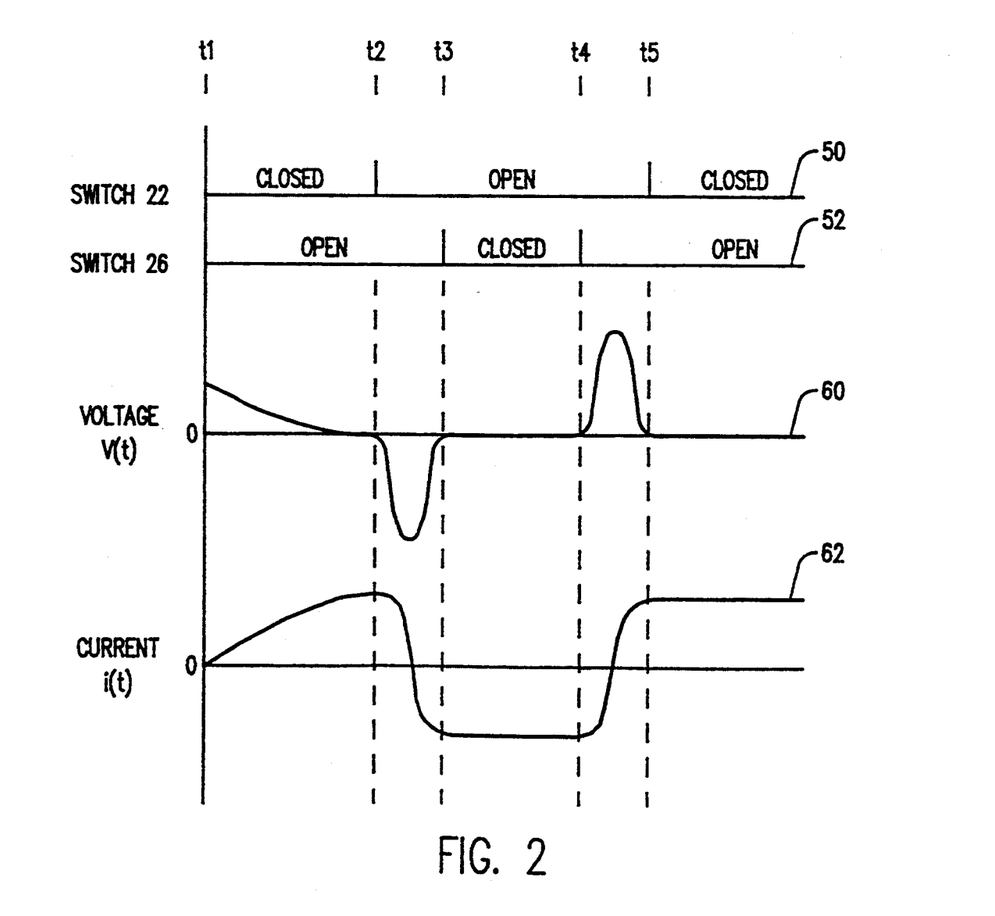
FIG. 2 is a timing graph showing the relationship between the switches and the voltage and current of the inductor in the present invention.

FIG. 2 is a graph showing the timing relationship for circuit 10. A line 50 represents the position of switch 22 versus time. A line 52 represents the position of switch 26 versus time. A line 60 represents the voltage across inductor 12 versus time. A line 62 represents the current through inductor 12 versus time.

The operation of circuit 10 may now be understood. The present invention uses the resonance between the inductor 12 and capacitor 14 to achieve rapid current reversal in the inductor 12. The opening and closing of the switches 22 and 26 is timed to coincide with half of a cycle of the resonance between inductor 12 and capacitor 14. Let T be the transition time of the field (i.e. the time for the energy to flow from inductor 12 to capacitor 14 and back again to inductor 12). Then $T=\pi(LC)^{\frac{1}{2}}$. The time between the opening of one switch and the closing of the other switch (t2–t3 and t4–t5) is set to be approximately equal to T.

Figure 3:
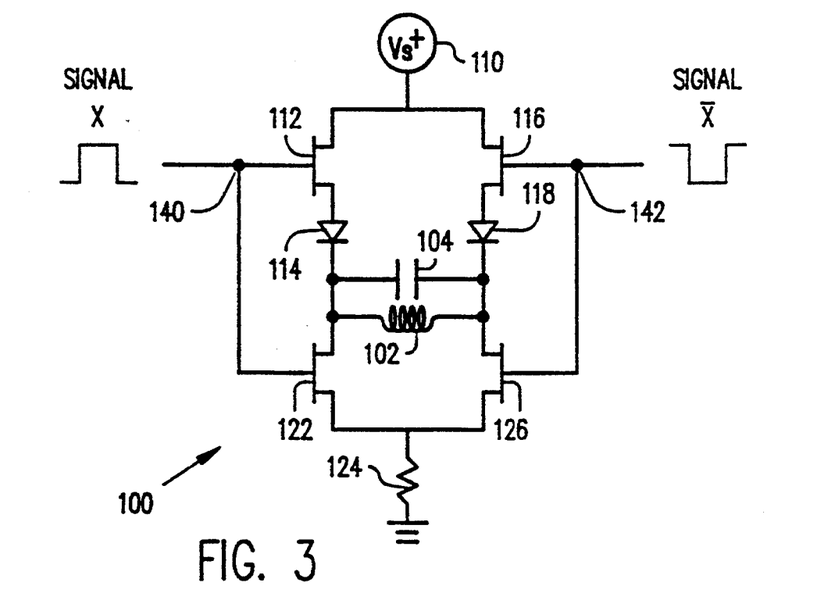
FIG. 3 is a circuit diagram of an embodiment of the present invention.

FIG. 3 is a diagram of a preferred circuit of the present invention and is designated by the general reference number 100. An inductor 102 having an inductance L, is connected in parallel with a capacitor 104 having capacitance C. A voltage source 110 is connected to a first side of inductor 102 via a P-channel FET transistor 112 and a diode 114. A P-channel FET transistor 116 and a diode 118 are connected between voltage source 110 and a second side of inductor 102. A N-channel FET transistor 122 is connected to the first side of inductor 102. A resistor 124 is connected between transistor 122 and ground. A N-channel FET transistor 126 is connected between the second side of inductor 102 and resistor 124. Transistors 112, 116, 122 and 126 are preferably MOS FETs.

The operation of circuit 100 may now be understood. Initially, at time t1, a positive signal X is applied at a node 140 to the gates of transistors 112 and 122, and a zero signal $\overline{X}$ is applied at a node 142 to the gates of transistors 116 and 126. Transistors 112 and 126 are energized, and transistors 116 and 122 are not energized. Current flows through transistor 112, diode 114, inductor 102, transistor 126 and resistor 124 to ground. The current flows left to right across inductor 102.

At time t2, the signals are reversed. The positive X signal is now applied to transistors 116 and 126, and the zero $\overline{X}$ signal is applied to transistors 112 and 122. Transistors 116 and 122 are energized and transistors 112 and 126 are not energized. However, diode 118 will block current flow from transistor 116. The electrical properties of the diode are such that it will block current flow when the voltage on the diode is negative. Between times t2 and t3 (see FIG. 2), diode 118 will experience a negative voltage and no current is allowed to flow into the inductor 102. The inductor 102 and the capacitor 104 are isolated and will resonate. Energy is transferred from inductor 102 to capacitor 104 and back again, energizing inductor 102 in the reverse direction. The time it takes to achieve this is half a cycle or $T=\pi(LC)^{\frac{1}{2}}$. At time t3 the voltage across inductor 102 is again zero. Diode 118 will no longer experience a negative voltage and will now allow current from transistor 116 to flow across inductor 104 from right to left through transistor 122 and resistor 124 to ground. The current across inductor 102 has been reversed.

When it is desired to again reverse the current, at time t4, the positive X signal is again applied to transistor 112 and 122 and the zero $\overline{X}$ signal is applied to transistors 116 and 126. Transistors 112 and 126 are energized, and transistors 116 and 122 are not energized. Diode 114 now experiences a negative voltage and will block the current flow between times t4 and t5. The inductor 102 and capacitor 104 are again isolated and will resonate for a time $T=\pi(LC)^{\frac{1}{2}}$. At time t5 the diode 114 experiences zero voltage and will now allow current to flow from transistor 112 across inductor 102 left to right, through transistor 126 and resistor 124 to ground.

A comparison of circuit 100 with the generalized circuit 10 is instructive. Transistors 112 and 126 are equivalent to switch 22. Transistors 116 and 122 are equivalent to switch 26. The diodes 114 and 118 effectively provide the timing for the switches. A complicated timing circuit is not necessary. The result is a compact circuit having a minimum number of components which is able to achieve very rapid current reversal in an inductor.

Figure 4:
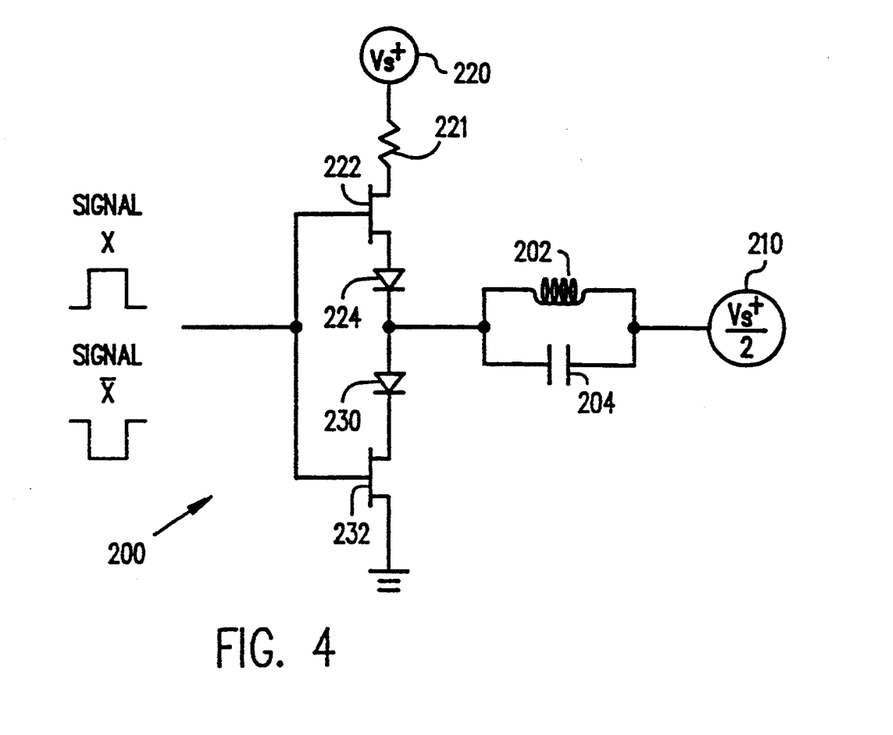
FIG. 4 is a circuit diagram of an alternative embodiment of the present invention.

FIG. 4 shows an alternative circuit of the present invention and is designated by the general reference number 200. An inductor 202 having inductance L is connected in parallel with a capacitor 204, having capacitance C. The first end of inductor 204 is connected to a voltage source 210. Source 210 has a voltage of Vs/2. A voltage source 220 is connected to a second side of inductor 202 via a resistor 221, a P-channel FET transistor 222 and a diode 224. A diode 230 is connected to the second side of inductor 202. A N-channel FET transistor 232 is connected between diode 230 and ground. Transistors 222 and 232 are preferably MOS FETs.

The operation of circuit 200 is similar to that of circuit 100. At time t1, a positive X signal is applied to the gates of transistors 222 and 232. Transistor 222 is energized and transistor 232 is not energized. Current flows from source 220 through resistor 221, transistor 222, diode 224, across inductor 202 from left to right to source 210. At time t2, a zero $\overline{X}$ signal is applied to transistors 222 and 232. Transistor 232 is energized and transistor 222 is not energized. Diode 230 blocks the flow of current between times t2 and t3 while inductor 202 and capacitor 204 resonate for $\pi(LC)^{\frac{1}{2}}$ seconds. At time t3, current flows from source 210, across inductor 202 right to left, through diode 230, transistor 232 to ground. At time t4, the positive X signal is reapplied to transistors 222 and 232. Transistor 222 is energized and transistor 232 is not energized. Diode 224 blocks current flow between times t4 and t5 while inductor 202 and capacitor 204 resonate for $\pi(LC)^{\frac{1}{2}}$ seconds. At time t5, current flows from transistor 222 through diode 224, across inductor 202 left to right to source 210.

The following analysis show the advantage of using the invention over the prior art. Pertinent quantities have the following definitions:

L=winding inductance,
R=total series resistance,
I=current flow in winding,
RT=rise time of current,
Vs=supply voltage,
C=resonant capacitor, and
Vi=induced voltage amplitude.

The following equations represent basic relationships between the quantities for the invention and the prior art:

$\frac{1}{2}CVi^2 = \frac{1}{2}LI^2$,
RT=L/R for the prior art, and
RT=$\pi(LC)^{\frac{1}{2}}$ for the present invention.

The time required to reverse the current in a head winding is derived from the basic equations to yield:

RT=LI/Vs for the prior art, and
RT=$\pi$LI/Vi for the present invention.

The present invention has an advantage in the rise time of $\pi$Vs/Vi over the prior art. Consider an electrical stepper motor which has a 12 volt supply. Devices, including diodes and transistors, that can handle an induced voltage of 360 volts are available. Hence, for the present invention, the switching speed of this motor can be increased by a factor of 9.5.

Next, consider a magnetic recording head which has a 5 volt supply. Heads and devices which can handle an induced voltage of 300 volts are readily available. The switching speed of this head can be increased by a factor of 15 by using the present invention.

Figure 5:
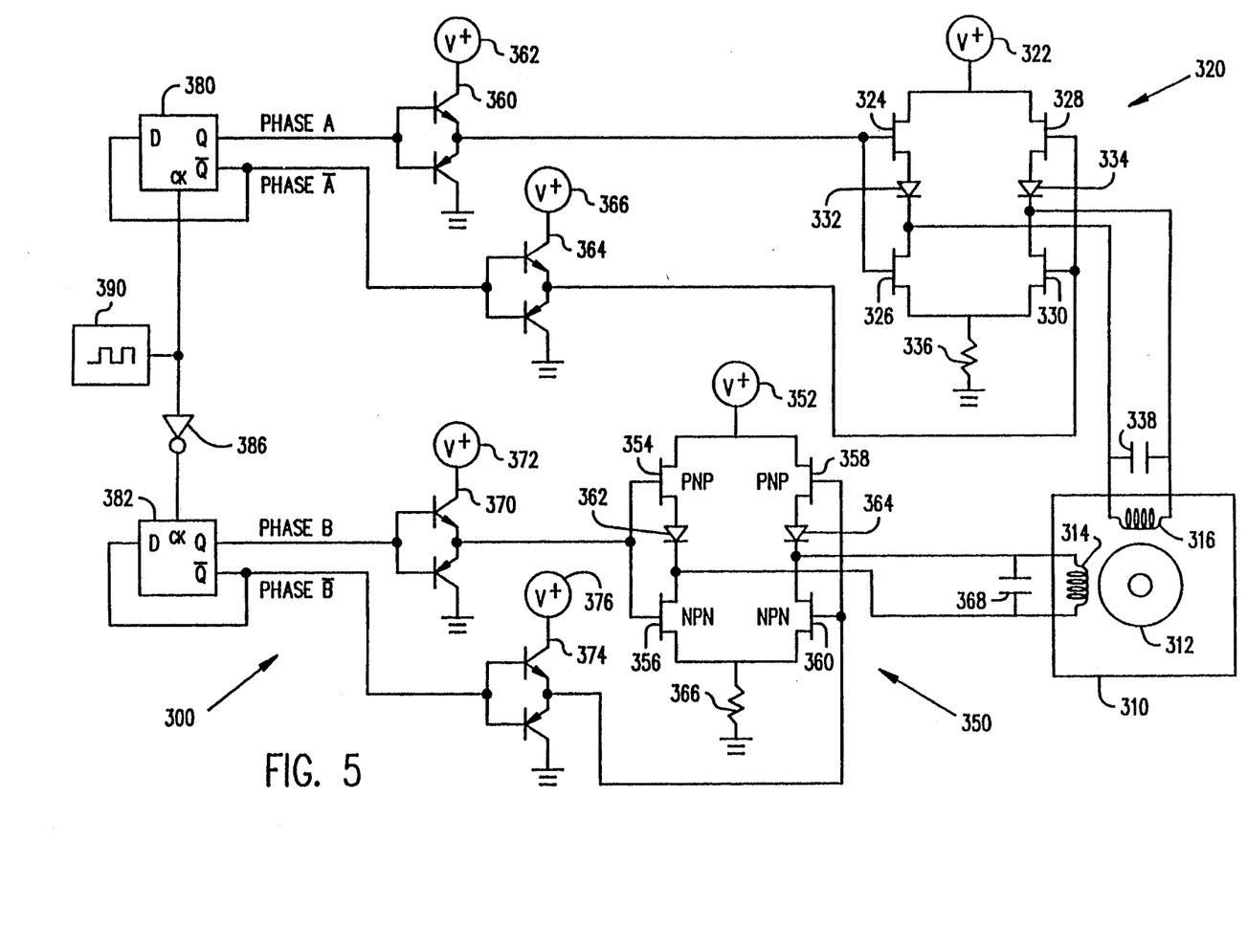
FIG. 5 is a circuit diagram of the present invention as used in a stepper motor.

FIG. 5 shows a schematic diagram of a stepper motor system of the present invention and is designated by the general reference number 300. System 300 comprises a mechanical stepper motor 310, which may be a STH-39D002 motor made by Shimano Kenshi Corporation of Japan. Motor 310 has a permanent magnetic rotor 312 and a plurality of magnetic windings 314 and 316. Only two windings 314 and 316 are shown for illustration purposes. However, as is known in the art, windings 314 and 316 are comprised of numerous alternating windings which are connected in series and arranged around the periphery of rotor 312.

A circuit 320 comprises a voltage source 322, transistors 324, 326, 328, 330, a pair of diodes 332 and 334, resistor 336, capacitor 338, and winding 314. Circuit 320 is similar to circuit 100 of FIG. 3 with the winding 316 substituted for inductor 102. A circuit 350 comprises a voltage source 352, transistors 354, 356, 358, 360, a pair of diodes 362 and 364, a resistor 366, a capacitor 368 and winding 314. The circuit 350 is similar to circuit 100 of FIG. 3 with the winding 314 substituted for inductor 102.

A bipolar transistor 360 is connected between a voltage source 326 and ground. Transistor 360 is connected to transistors 324 and 326. A bipolar transistor 364 is connected between a voltage source 366 and ground. Transistor 364 is connected to transistors 328 and 330. A bipolar transistor 370 is connected between a voltage source 372 and ground. Transistor 370 is connected to transistors 354 and 356. A bipolar transistor 374 is connected between a voltage source 376 and ground. Transistor 374 is connected to transistors 358 and 360.

A flip-flop 380 is connected to transistors 360 and 364. A flip-flop 382 is connected to transistors 370 and 374. An inverter 386 is connected to the clock input of flip-flop 382. A squarewave generator 390 is connected to the clock input of flip-flop 380 and inverter 386.

The operation of system 300 may now be understood. Generator 390 outputs a squarewave signal at a frequency 2F. This signal provides the clocking for flip-flop 380. The signal is inverted by inverter 386 and provides clocking for flip-flop 382. Flip-flop 380 outputs a phase A signal to transistor 360 and a phase $\overline{A}$ signal to transistor 364. Phase A and $\overline{A}$ are squarewaves at frequency F which have a phase difference of 180 degrees. Flip-flop 382 outputs a phase B signal to transistor 370 and a phase $\overline{B}$ signal to transistor 374. Phase B and $\overline{B}$ signals are squarewaves at frequency F which have a phase difference of 180 degrees. The phase B signal is phase shifted 90 degrees behind the phase A signal. Phase A and $\overline{A}$ signals cause transistors 360 and 364 to alternately energize the transistors of circuit 320 similar to the operation as described for circuit 100 of FIG. 3. The phase B and $\overline{B}$ signals cause transistors 370 and 374 to alternately energize the transistors of circuit 350 to similar to the operation as described for circuit 100 of FIG. 3. The result is that the current in windings 314 and 316 is rapidly reversed with the reversal of current in winding 314 lagging the reversal of current in winding 316 by 90 degrees in phase. This current switching drives the rotor. Current switching to drive electrical motors is well known in the art. However, circuits 320 and 350 of the present invention allow the windings 314 and 316 to be driven at a much higher frequency. This greatly improves the maximum speed of motor 310.

In another embodiment, the circuit 200 of FIG. 4 may be substituted for circuits 320 and 350 of system 300. In such a case, only the phase A and phase B signals would be required.

Figure 6A:
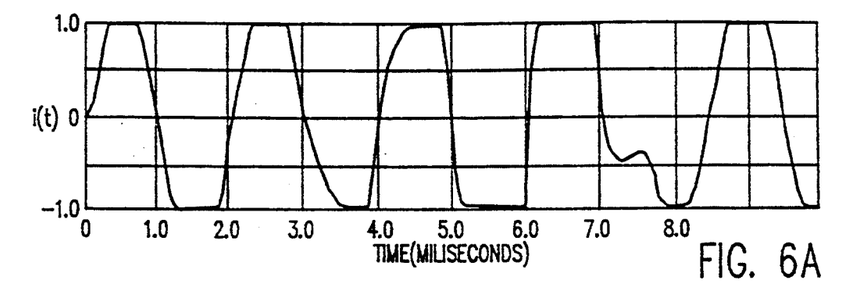
FIG. 6A is a graph of current versus time for a motor of the prior art.
Figure 6B:
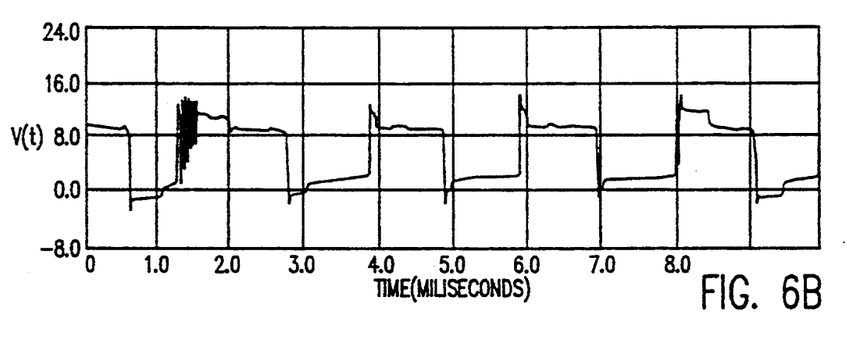
FIG. 6B is a graph of voltage versus time for a motor of the prior art.

FIGS. 6A and 6B show the voltage and current versus time for an inductor winding of a typical prior art stepper motor. The inductor winding is driven by the standard H driver type of circuit as is known in the art. The motor was operating at a maximum speed of 600 steps per second, with the inductor being driven at 600 hertz. The inductor could not be driven at a faster speed. Note the relatively gradual current reversals and the skip in the current signal at around 7.0 milliseconds.

Figure 7A:
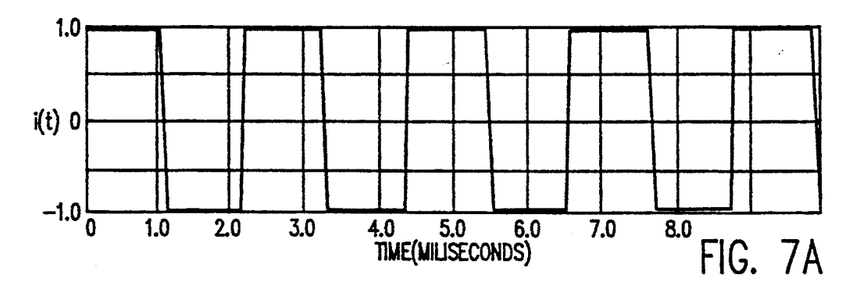
FIG. 7A is a graph of current versus time for a motor of the present invention.
Figure 7B:
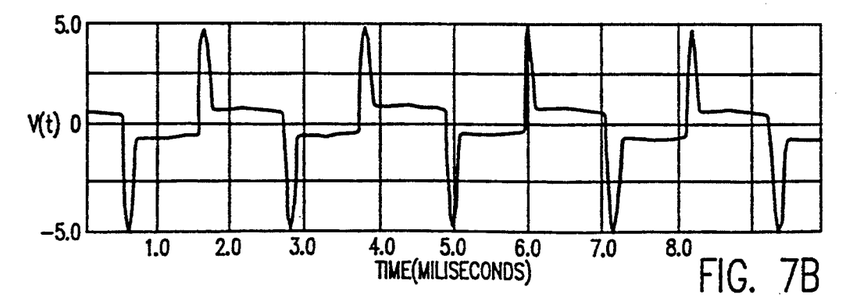
FIG. 7B is a graph of voltage versus time for a motor of the present invention.

FIGS. 7A and 7B show the voltage and current versus time for inductor 316 of system 300. The motor was also being operated at 600 steps per second (600 hertz for inductor 316). Generator 390 was being driven at 1200 hertz. Note the sharp current reversals.

Figure 8A:
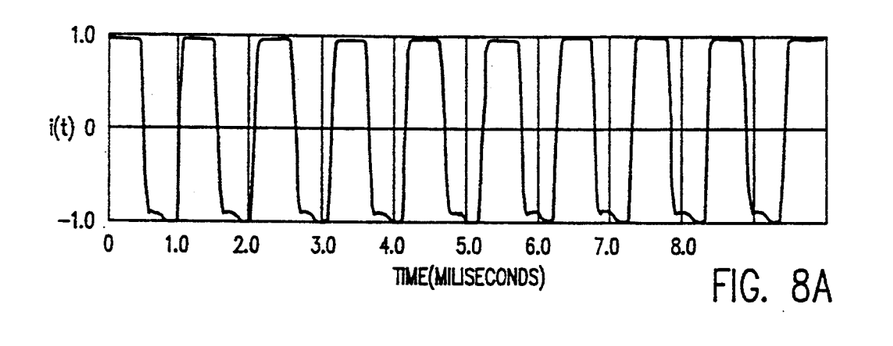
FIG. 8A is a graph of current versus time for a motor of the present invention.
Figure 8B:
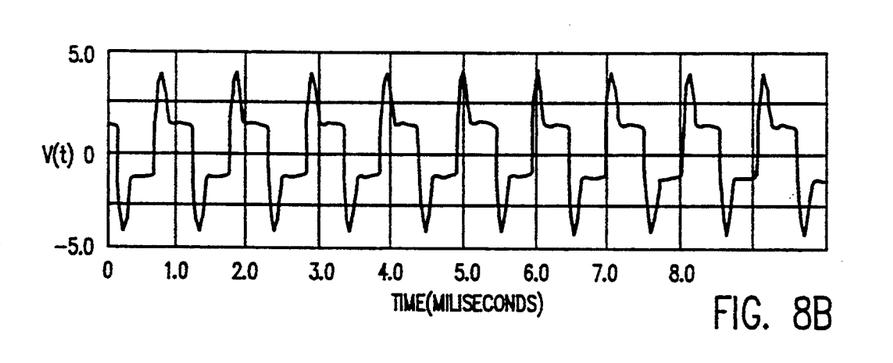
FIG. 8B is a graph of voltage versus time for a motor of the present invention.

FIGS. 8A and 8B show the voltage and current versus time for inductor 316 of system 300. Here the motor is being run at a speed of 1500 steps per second (1500 hertz for inductor 316). Generator 390 was being driven at 3000 hertz. Note the current reversals are still very sharp. The motor system 300 of the present invention was able to increase the speed performance of the motor by 2.5 times.

Figure 9:
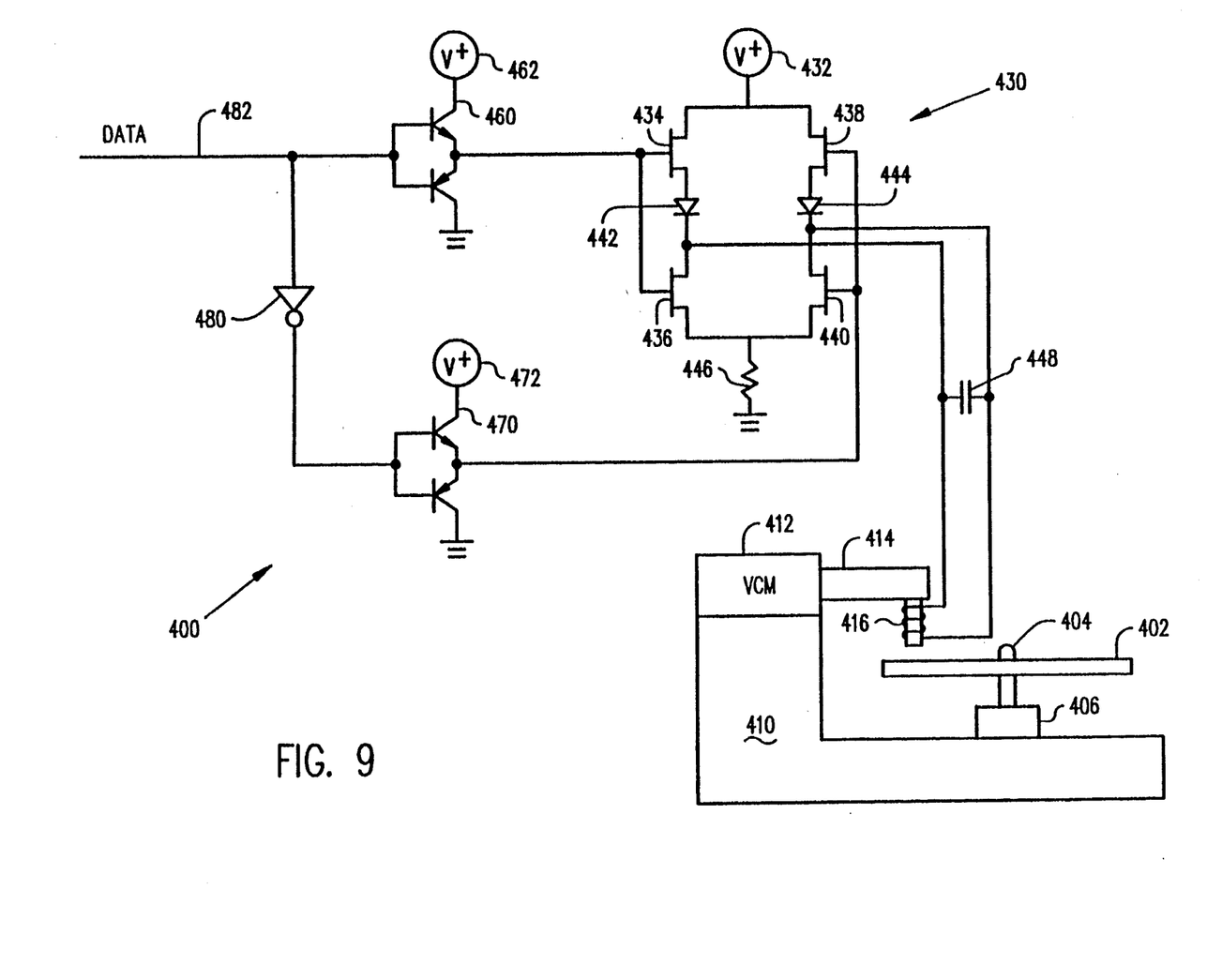
FIG. 9 is a circuit diagram of the present invention as used in a recording system.

FIG. 9 shows a schematic diagram of a data recording system of the present invention and is designated by the general reference number 400. System 400 comprises a recording disk 402 rotatably mounted on a spindle 404. Disk 402 may be a magnetic disk. Spindle 404 is attached to a spindle motor 406 which rotates the spindle 404. Motor 406 is attached to a disk drive body 410. A voice coil motor 412 is attached to body 410. Voice coil motor 412 is attached to an actuator arm 414. Voice coil motor 412 moves arm 414 in a radial direction over disk 402. A magnetic recording head 416 is located at the end of arm 414. Head 416 is illustrated electrically as an inductor winding.

A circuit 430 is comprised of a voltage source 432, transistors 434, 436, 438, 440, a pair of diodes 442 and 444, a resistor 446, a capacitor 448, and head 416. Circuit 430 is similar to circuit 100 of FIG. 3 with the head 416 substituted for inductor 102. A bipolar transistor 460 is connected between a voltage source 462 and ground. Transistor 460 is connected to transistors 434 and 436. A bipolar transistor 470 is connected between a voltage source 472 and ground. Transistor 470 is connected to transistors 438 and 440. An inverter 480 is connected to transistor 470. A data line 482 is connected to transistor 460 and inverter 480.

The operation of system 400 may now be understood. Digital data is applied to line 482. Bipolar transistors 460 and 470 alternately energize transistors 434, 436, 438 and 440, respectively similar to the operation as described for circuit 100 of FIG. 3. The current is rapidly reversed in the inductor head 416 and data is written on the disk 402.

In another embodiment, circuit 200 of FIG. 4 may be substituted for circuit 430 of system 400.

Figure 10A:
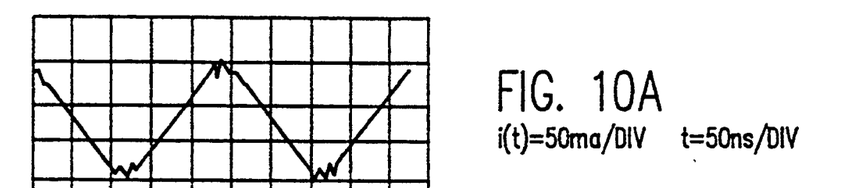
FIG. 10A is a graph of current versus time for a magnetic head of the prior art.
Figure 10B:
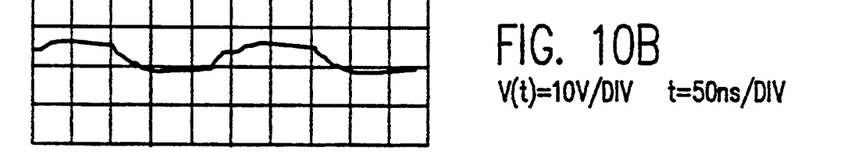
FIG. 10B is a graph of voltage versus time for a magnetic head of the prior art.
Figure 11A:
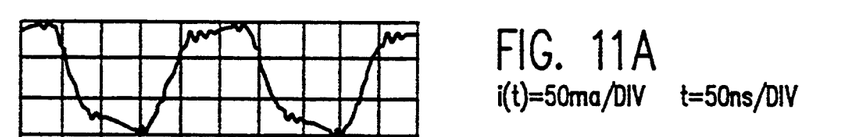
FIG. 11A is a graph of current versus time for a magnetic head of the present invention.
Figure 11B:
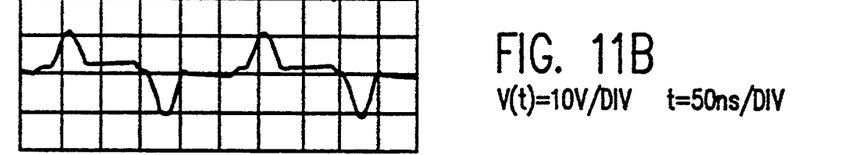
FIG. 11B is a graph of voltage versus time for a magnetic head of the present invention.

FIGS. 10A and 10B show oscilloscope tracings of the current and voltage of a magnetic head used in a conventional recording system. The magnetic head has a inductance L=2.5 microhenries and a resistance R=4.3 ohms. The head was being driven at 4 Mhz. Note the relatively gradual current reversals.

Figure 12A:
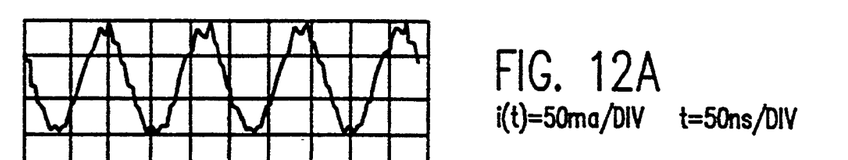
FIG. 12A is a graph of current versus time for a magnetic head of the present invention.
Figure 12B:
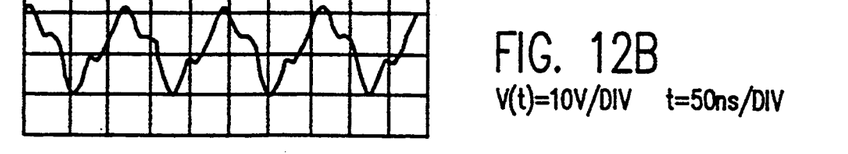
FIG. 12B is a graph of voltage versus time for a magnetic head of the present invention.

FIGS. 11A, 11B, 12A and 12B show the oscilloscope tracings of the current and voltage of head 416 in system 400. The same inductor head as was used in the measurements for FIGS. 10A and 10B above was used as head 416. The head 416 was driven at 4 Mhz in FIGS. 11A and 11B and 8 Mhz in FIGS. 12A and 12B. The quality of the waveform in FIGS. 12A and 12B is sufficient to support the recording frequency and represents a doubling over the frequency of the conventional circuit.

Figure 13:
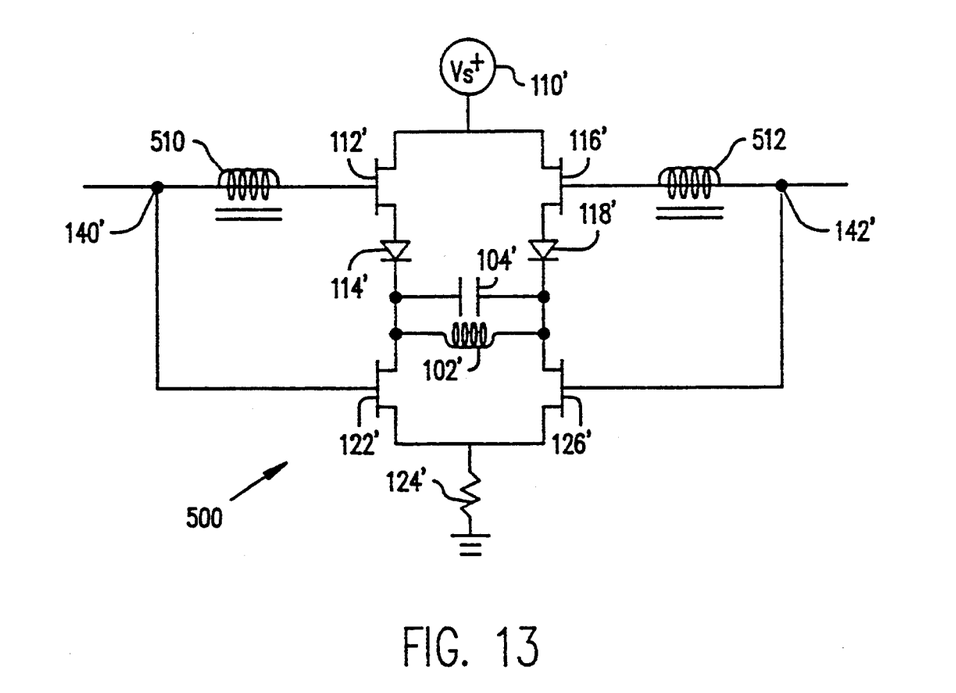
FIG. 13 is a circuit diagram of an alternative embodiment of the present invention.

FIG. 13 shows a circuit diagram of an alternative embodiment of the present invention and is designated by the general reference number 500. Elements of circuit 500 which are similar to elements of circuit 100 of FIG. 3 are designated by a prime reference number. Circuit 500 has a delay line 510 connected between node 140' and transistor 112' and a delay line 512 connected between node 142' and transistor 116'. Other types of signal delay devices may also be used.

Circuit 500 may be used when extremely high frequency current switching is required. At frequencies below 1 Mhz, the elements of circuit 100 perform as nearly ideal components. However, as the switching frequency goes above 1 Mhz, these elements may not operate as well due to nonlinear behavior of the transistors and diodes. This nonlinear behavior is due to stored charges and resistive effects which may cause a time dependent phaseshift in the current and voltage waveforms.

Circuit 500 solves this problem by providing a slight delay to the signals to the transistors 112' and 116'. This delay is a small percentage of the cycle time of the circuit. In a preferred embodiment the delay may be 10 to 20 nanoseconds. This slight delay precharges the LC portion of the circuit before it goes into resonance. This precharge effectively shifts the phase of the voltage and current waveforms of the circuit to compensate for the phaseshift caused by nonlinear effects.

Circuit 200 of FIG. 4 may also be adapted to work at higher frequencies in a similar manner. In this case, a delay device would be inserted between the X-signal source and transistor 222. The resulting circuit would also achieve the precharging effect as shown in circuit 500.

Figure 14:
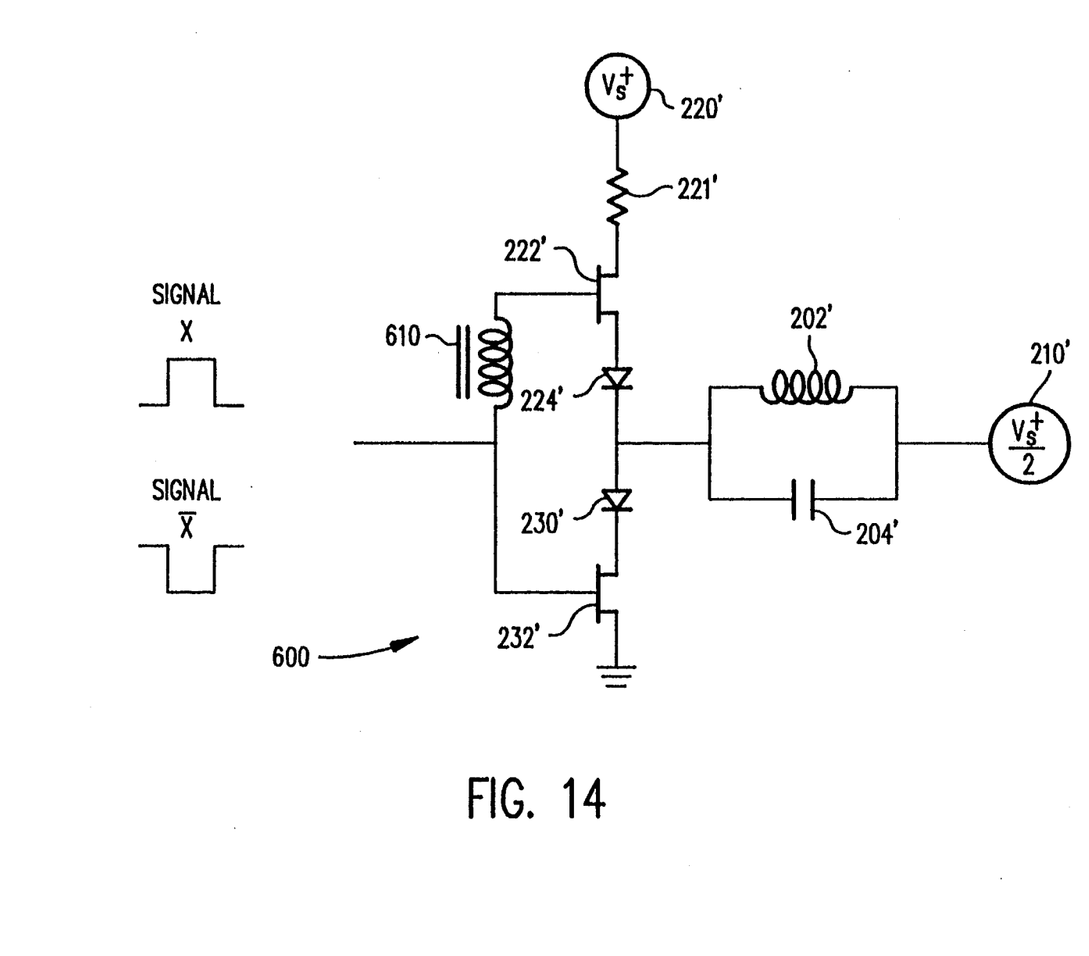
FIG. 14 is a circuit diagram of an alternative embodiment of the present invention.

FIG. 14 shows such an alternative circuit embodiment and is designated by the general reference number 600. Elements of circuit 600 which are similar to elements of circuit 200 are designated by a prime reference number. Circuit 600 has a delay line 610.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An inductor current switching system comprising:
   an inductor;
   a capacitor connected in parallel with the inductor;
   a first transistor connected between a voltage source and a first side of the inductor;
   a second transistor connected between a voltage source and a second side of the inductor;
   a third transistor connected between a voltage drain and the first side of the inductor;
   a fourth transistor connected between a voltage drain and the second side of the inductor;
   the first and fourth transistors comprising a first transistor set for providing a first current path through the inductor, and the second and third transistors comprising a second transistor set for providing a second current path through the inductor;
   a first diode connected in series with the first current path;
   a second diode connected in series with the second current path;
   a transistor control means connected to the first, second, third and fourth transistors, for providing an on signal to the first transistor set and providing an off signal to the second transistor set, and then providing an on signal to the second transistor set and providing an off signal to the first transistor set; and
   a delay device connected between the transistor control means and the first and second transistor sets for providing a time offset between the switching of the first and fourth transistors of the first transistor set and for providing a time offset between the switching of the second and third transistors of the second transistor set in order to compensate for nonlinear effects at frequencies greater than 1 Mhz.

2. The system of claim 1, wherein the time offset is in the range of 10–20 nanoseconds.

3. The system of claim 1, further including:
   a magnetic data storage device, wherein the inductor is a transducer head of the magnetic data storage device.

4. An inductor current switching system comprising:
   an inductor;
   a capacitor connected in parallel with the inductor;

a first transistor connected to a first voltage source and a first side of the inductor, the first transistor providing a first current path through the inductor;

a second transistor connected to the first side of the inductor and a voltage drain, the second transistor providing a record current path through the inductor;

a second voltage source connected to a second side of the inductor;

a first diode connected in series with the first current path;

a second diode connected in series with the second current path;

a transistor control means connected to the first and second transistors, for providing an on signal to the first transistor and providing an off signal to the second transistor, and then providing an on signal to the second transistor and providing an off signal to the first transistor; and a delay device connected between the transistor control means and the first transistor for providing a time offset between the switching of the first transistor and the second transistor in order to compensate for nonlinear effects at frequencies greater than 1 Mhz.

5. The system of claim 4, wherein the time offset is in the range of 10–20 nanoseconds.

6. The system of claim 4, further including;

a magnetic data storage device, wherein the inductor is a transducer head of the magnetic data storage device.

* * * * *

UNITED STATES PATENT AND TRADEMARK OFFICE
CERTIFICATE OF CORRECTION

PATENT NO. : 5,402,052
DATED : March 28, 1995
INVENTOR(S) : D. Cheng et al

It is certified that error appears in the above-indentified patent and that said Letters Patent is hereby corrected as shown below:

On title page,
item [56], under U.S. Patent Documents change the second patent number to --4,434,392-- and delete "4,434,922"

Column 2, line 31 delete "178" and add --1/2-- this should remain a superscript.

Column 5, line 8 selete "show" and add --shows--

Signed and Sealed this

Twenty-ninth Day of August, 1995

Attest:

BRUCE LEHMAN

*Attesting Officer*        *Commissioner of Patents and Trademarks*